United States Patent [19]
LeBreton et al.

[11] 3,911,956
[45] Oct. 14, 1975

[54] MULTIPORT VALVE

[75] Inventors: Edward T. LeBreton, Mentor; Arthur J. Wiltshire, Richmond Heights, both of Ohio

[73] Assignee: Pacific Fabrication, Inc., El Monte, Calif.

[22] Filed: Sept. 24, 1973

[21] Appl. No.: 400,011

[52] U.S. Cl. ............ 137/625.46; 210/411; 251/317
[51] Int. Cl.² ...................... F16K 7/16; B01D 23/24
[58] Field of Search..... 137/625.46, 625.15, 625.18, 137/625.17, 625.47, 609; 210/411, 424, 278, 288, 169, 425, 426; 251/317, 314, 316

[56] References Cited
UNITED STATES PATENTS

| | | | |
|---|---|---|---|
| 2,051,155 | 8/1936 | Staegemann............... | 137/625.46 X |
| 2,857,929 | 10/1958 | Whitlock, Jr. ............. | 137/625.46 X |
| 2,989,082 | 6/1961 | Ray............................... | 137/625.46 |
| 3,105,518 | 10/1963 | Kunz........................... | 137/625.46 X |
| 3,513,981 | 5/1970 | Mendelow ................. | 137/625.15 X |
| 3,640,310 | 2/1972 | Erlich ........................... | 137/625.46 |
| 3,809,247 | 5/1974 | Brett............................. | 210/278 |
| R24,055 | 8/1955 | Daniels....................... | 137/625.46 X |

*Primary Examiner*—Martin P. Schwadron
*Assistant Examiner*—Robert J. Miller
*Attorney, Agent, or Firm*—McNenny, Farrington, Pearne & Gordon

[57] ABSTRACT

A multiport valve for selectively connecting a plurality of valve ports to one another is disclosed. The valve includes a valve housing separable body sections which define first and second chambers. A plurality of inlet and outlet ports are provided in the valve housing and all of those ports are located in the body section defining the second chamber so that the valve body sections may be separated for maintenance purposes without disturbing conduit connections to the valve ports. A rotary valving switch plate separates the first and second chambers to provide selective communication between the first chamber and at least one port, to provide selective communication among the ports, and to block communication between the chambers. The first chamber is provided with fluid pressure from a pump by a passage which is defined by both body sections from an inlet port in the body section defining the second chamber.

8 Claims, 3 Drawing Figures

MULTIPORT VALVE

BACKGROUND OF THE INVENTION

This invention relates to multiport valves and, more particularly, to a multiport valve for a swimming pool filter system that provides fluid communication from a pump to the filter system for flow to a swimming pool through the filter, to backwash the filter, to bypass the filter, and to block flow from the pump at the valve. These operations are typically performed by a rotary multiport valve having a valve casing and a rotary switch plate dividing the valve casing into first and second chambers. By rotating the switch plate, the selective communication between the pump and the filter system obtains.

It is preferable to port the valve so that pump pressure is admitted to one valve chamber and then distributed by the switch plate to the other chamber for subsequent distribution to selected ports communicating with that other chamber. It is also desirable to provide unidirectional flow from the one chamber to the other chamber so that the pump pressure will tend to keep the switch plate seated.

In U.S. Pat. No. 3,513,981, there is disclosed a multiport valve that provides for unidirectional flow of pump pressure from one valve chamber to the other valve chamber. In that patent, however, the inlet port from the pump is located in one separable casing section, while the remaining ports are located in the other separable casing section, thus necessitating the removal of a conduit from the one valve casing section to gain access to the interior of the valve for maintenance purposes.

A more desirable valve from the standpoint of maintenance is set forth in U.S. Pat. No. 3,640,310. In that patent, there is disclosed a multiport valve having a valve casing which does not have separable upper and lower chamber-defining body sections. The patentee provides access to the interior of the valve by a cover. Therefore, the cover may be removed without disturbing conduit connections at the valve ports. Since the valve is not separable between the valve chambers, the valve gasket of the patentee serves only as a seal between low pressure ports and the selector rotor, and another seal is provided between the valve body and the valve cover. With this arrangement, the cover may be removed for access to the interior of the valve without disturbing conduit connections to the valve body. However, the valve casing is a relatively deep casting and it may be difficult to reach into the valve casing to replace the gasket. Also, since the gasket is not positively clamped between valve sections, complex gasket and gasket seat constructions are resorted to to ensure that the gasket will not be washed away by fluid flow.

SUMMARY OF THE INVENTION

This invention overcomes the disadvantages of prior art multiport valves by providing a valve having separable body sections defining first and second chambers and having all of its inlet and outlet ports located in the body section defining the second chamber, but with unidirectional flow from the pump to the first chamber and then to the second chamber. A gasket is clamped between the separable body sections to seal those sections and to provide a gasket seal for a flow selector switch plate. According to this invention, the gasket has a relatively incompressible core, such as steel, and a relatively compressible case, such as rubber. The case is relatively thick in portions engaged by the switch plate and is relatively thin in portions clamped between the separable body sections so that proper seals are formed in both of these areas. The pump inlet port is defined by a portion of the body section defining the second chamber and a passageway is defined by that body section and by a portion of the body section defining the first chamber.

DETAILED DESCRIPTION OF THE INVENTION

Figure 1:
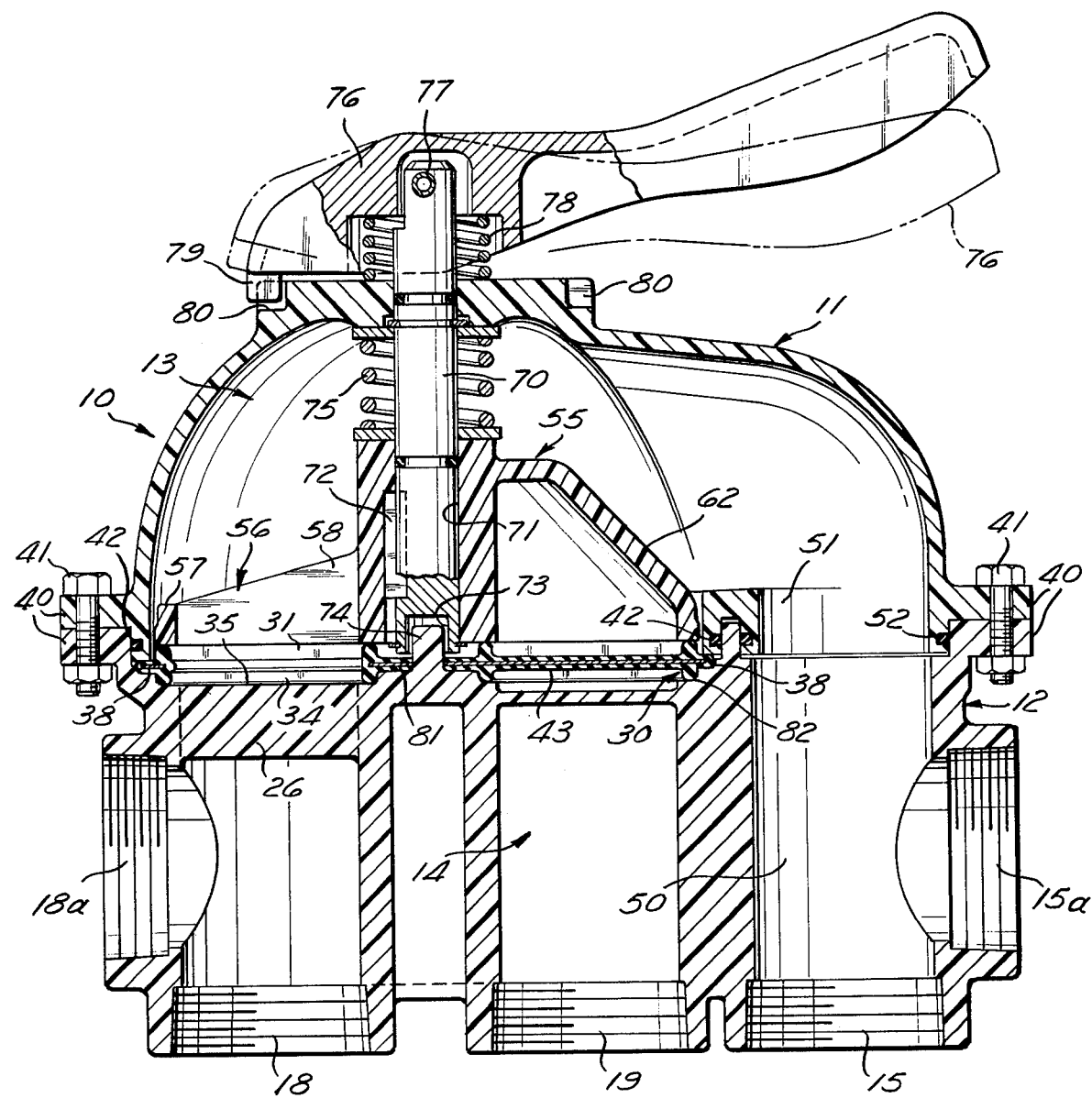
FIG. 1 is a cross sectional view of a multiport valve in accordance with the teachings of this invention.
Figure 2:
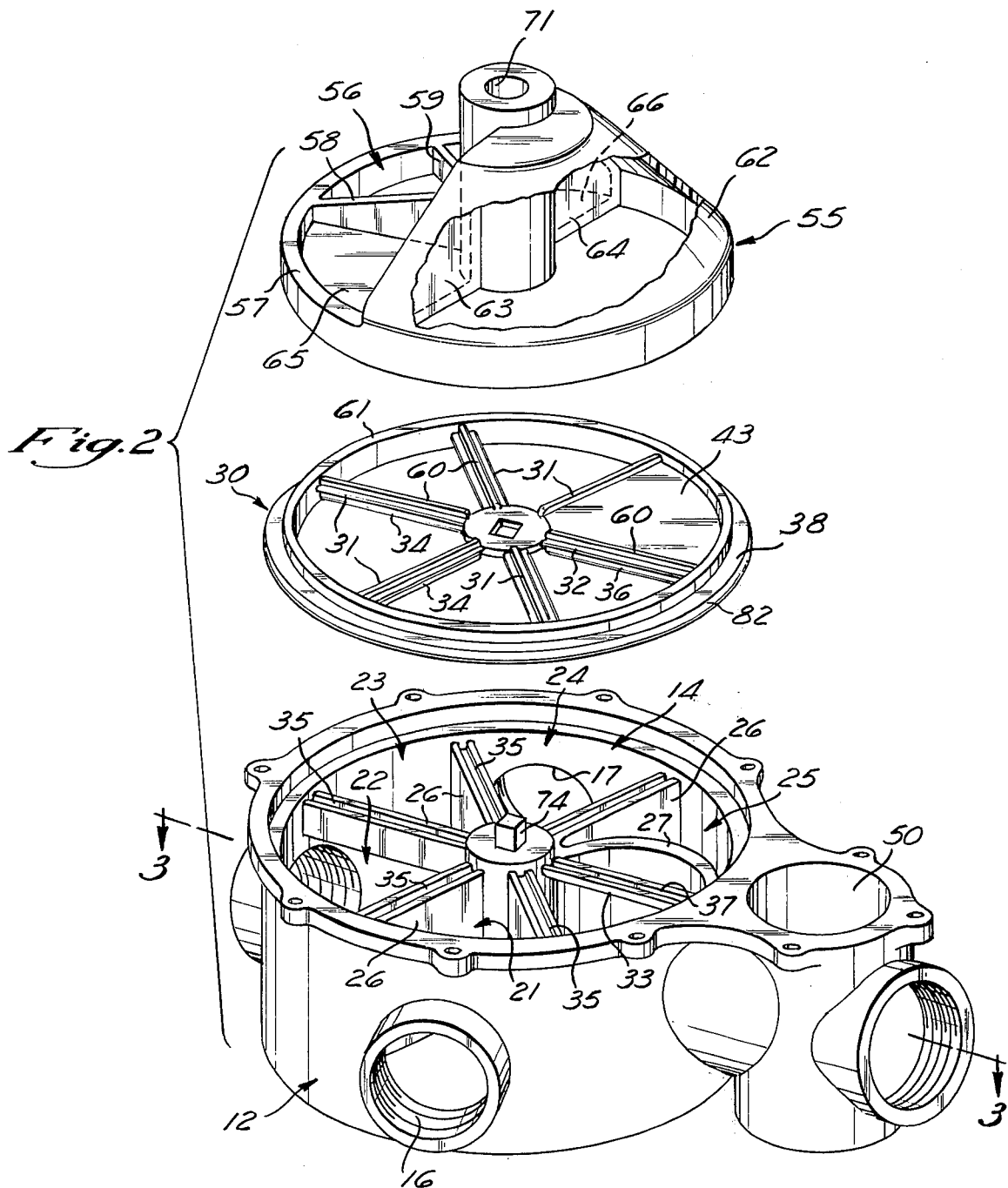
FIG. 2 is a perspective, exploded view of a switch plate, a switch plate gasket, and a separable body section defining the second chamber.
Figure 3:
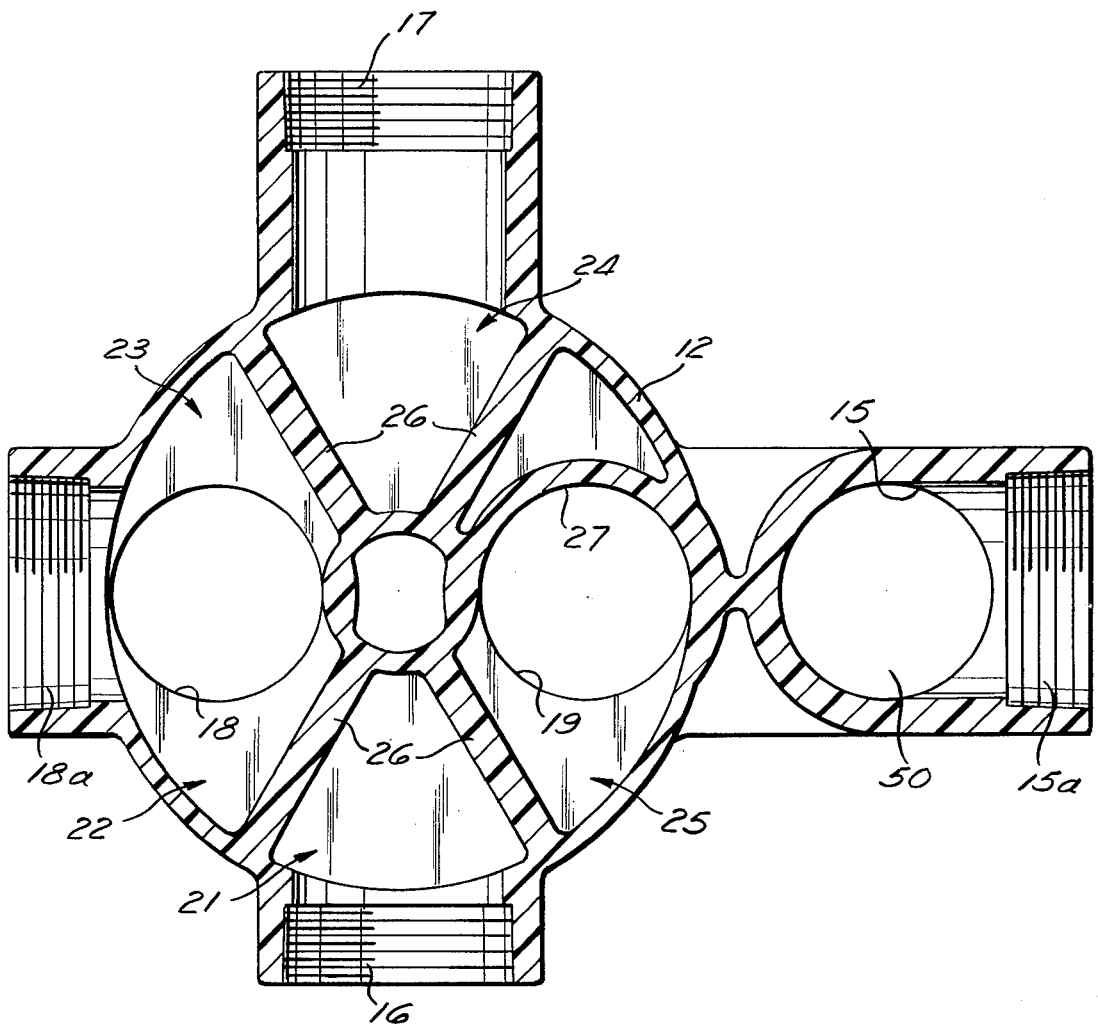
FIG. 3 is a cross sectional view, the plane of the section being indicated by the line 3—3 in FIG. 2.

Referring now to the drawings, there is illustrated a multiport valve 10 for selectively connecting a plurality of valve ports to one another. The valve 10 is particularly useful in swimming pool applications where the valve connects an inlet port of a filter to a pump for filtering the pool water and then may connect the outlet port of the filter to the pump for a back-washing operation. The valve 10 has separable body sections 11 and 12 defining first and second chambers 13 and 14, respectively. The body section 12, which defines the second chamber, is provided with a plurality of inlet and outlet ports 15, 16, 17, 18, and 19. The ports 15-19 are adapted to be respectively connected to conduits communicating with a pump, the swimming pool, a waste drain, the inlet end of a filter, and the outlet end of the filter. It may be noted that auxiliary ports 18a and 15a respectively communicate with the ports 18 and 15, and thus comprise auxiliary ports for alternate filter and pump connections depending upon the plumbing layout of the system. Depending upon the connection, the unused auxiliary or main port may be blocked by a suitable plug.

The second chamber 14 is separated into a plurality of segmented chambers 21, 22, 23, 24, and 25 by radially extending partitions 26, and, with respect to the chambers 24 and 25, by a partition 26 and a curved partition 27. It may be noted that the partition 26 which separates the segmented chambers 22 and 23 terminates at the port 18 so that the chambers 22 and 23 are in communication with the ports 18 and 18a at all times.

A sealing gasket 30 is provided between the separable body sections 11 and 12, and has a plurality of radially extending spokes 31 which are seated on the upper surface of each partition 26. The gasket 30 also includes a spoke 32 which is seated on a web 33 which extends across the segmented chamber 25. A depending portion 34 of each spoke 31 is received within a slot 35 in each partition 26 and a depending portion 36 of the spoke 32 is received within a slot 37 in the web 33.

A peripheral edge portion 38 of the gasket 30 is clamped between the body sections 11 and 12, as is indicated most clearly in FIG. 1. To effect the connection of the body sections 11 and 12, each section is provided with a flange 40 through which a plurality of bolts 41 extends. Although the clamped portion 38 of the gasket 30 provides an adequate seal between the body sections 11 and 12, an O-ring 42 may be provided between those sections to further ensure that there will be no leakage. For reasons which will hereinafter become apparent, a web 43 is provided between one of the spokes 31 and the spoke 32 to cover the portion of the chamber 25 having the partition 27 therein.

Fluid is admitted to the first chamber 13 from the port 15 (or the port 15a), which is connected to a swimming pool pump (not shown). As may be seen most clearly in FIG. 1, a portion of the body section 12 defines a passageway 50 which communicates with a passageway 51 defined by the body section 11. A seal between these passageways is provided by an O-ring 52 in the body section 11.

Flow from the chamber 13 is selectively directed to one of the segmented chambers by a rotatable switch plate 55, which also provides for the blockage of flow between the chamber 13 and the chamber 14 and for cross-porting between at least two segmented chambers. To this end, the switch plate 55 is provided with an aperture 56 therein defined by a rim portion 57 and by radially extending partitions 58 and 59 of the switch plate 55. The partitions 58 and 59 and the arcuate extent of the rim portion 57 between those partitions are dimensioned to form a seal on projecting ribs 60 of the spokes 31 and 32, and with a projecting lip 61 of the gasket 30. The switch plate 55 is also provided with a hood 62 which extends between the rim 57 and radially extending and diametrically aligned walls 63 and 64. The walls 63 and 64 are adapted to seal against diametrically aligned ribs 60 of the gasket 30. Areas of the switch plate between the wall 63 and the partition 58, and between the wall 64 and the partition 59, are blocked by web portions 65 and 66, respectively.

By rotating the switch plate 55 relative to the gasket 30, one of a plurality of the segmented chambers may be connected to the chamber 13, or all of those chambers may be blocked from communication with the chamber 13.

The switch plate 55 may be rotated relative to the gasket 30, and therefore the segmented chambers 21 and 25, by a handle assembly which includes a shaft 70 that extends through an aperture 71 in the switch plate 55, and which is restrained against rotation relative thereto by a key 72. One end of the shaft 70 has a circular aperture 73 therein which is adapted to rotatably mate with a projecting portion 74 of the body section 12. A compression spring 75 extends between the switch plate 55 and the body section 11 to firmly press the switch plate against the gasket 30. The shaft 70 projects through the body section 11 and has a handle 76 pivotally attached thereto by a pin 77. There is provided a spring 78 which biases the handle 76 in the position illustrated in solid outline in FIG. 1 so that a tooth 79 on the handle is biased into engagement with one of a plurality of notches 80 provided in the body section 11. The notches 80 are disposed so that the aperture 56 properly communicates with a segmented chamber 21–25 or is blocked by the web 43. By moving the handle to its phantom outline position, the tooth 79 is disengaged from its notch 80 and the shaft 70 and the switch plate 55 carried by the shaft may be rotated to select a desired position.

The compression spring 75 biases the switch plate 55 into firm seating engagement with the gasket 30. The seating engagement is also aided by the pump pressure in the chamber 13. It may be noted in FIG. 1 that the gasket 30 has a relatively incompressible core 81 which may be a flat apertured steel plate. The gasket 30 also comprises a relatively compressible case 82 which may be made from rubber. It may be noted that the relatively compressible case 82 has relatively thick portions positioned between the switch plate and the partitions 26 and has relatively thin portions clamped between the separable body sections 11 and 12. This arrangement provides a proper seal around the segmented chambers, and provides a rim portion between the separable body sections which may be strongly compressed without excessive extrusion by the body sections.

As was previously indicated, the switch plate 55 may be placed in a number of valving positions. With the aperture 56 positioned over the segmented chamber 23, water flows from the pump to the inlet port of a filter (not shown) through the port 18 (or 18a). The outlet port of the filter is connected to the port 19 so that the filtered water enters the segmented chamber 25 and is conducted to the port 16 by the hood 62 of the switch plate 55 which bridges the segmented chambers 21 and 25. The port 16 is connected to the pool by a suitable conduit.

The filter may be backwashed by rotating the switch plate until the aperture 56 communicates with the segmented chamber 25 and with the hood portion 62 bridging and providing fluid communication among the chambers 22, 23, and 24. With the switch plate 55 in this position, the pump is placed in fluid communication with the port 19, and therefore the outlet port of the filter. The filter is backwashed and fluid flows from the filter to the port 18 (or 18a) and is directed by the hood 62 to the waste port 17.

After backwashing the filter, it may be necessary to clear the conduit leading from the port 19 to the filter outlet. To perform this operation, the switch plate 55 is rotated so that its aperture 56 communicates with the segmented chamber 22 and the chambers 24 and 25 are bridged by the hood 62 of the switch plate 55. With the switch plate 55 in this position, the pump is connected to the filter inlet port and the flow from the filter outlet port through the port 19 is conducted to the waste port 17. When the filter outlet conduit is flushed in this manner, the switch plate may be returned to its normal filtering condition noted above.

In order to service the filter, the filter may be bypassed by positioning the aperture 56 over the segmented chamber 21 so that water is fed directly to the pool through the port 16.

The pool may be drained and the filter bypassed by positioning the aperture 56 over the segmented chamber 24. Water is pumped from the pool to the waste port 17.

It may also be desirable to block the flow from the pump to all of the ports 16–19 without stopping the pump. This may be accomplished by positioning the aperture 56 over the web 43 in the gasket 30.

Although a preferred embodiment of this invention is illustrated, it is to be understood that various modifications and rearrangements of parts may be resorted to without departing from the scope of the invention.

What is claimed is:

1. A multiport valve for selectively connecting a plurality of valve ports to one another comprising a valve body, said valve body having separable body sections defining first and second chambers, a plurality of inlet and outlet ports in said valve body with all of said ports being located in the body section defining said second chamber, valving means separating said first and second chambers and including means to provide selective communication between the first chamber and at least one port, to provide selective communication among the ports, and to block communication between the chambers, said body sections being separable adjacent a plane passing through said valving means, passage means defined by both body sections providing fluid communication from an inlet port to said first chamber, said passage means being laterally offset from said valving means and being isolated from said valving means by wall means, said valving means including a gasket between said switch plate and said partition means, the periphery of said gasket being clamped between said body sections to provide a fluid seal for those sections, said gasket having a relatively incompressible core and a relatively compressible case, said case being relatively thick in portions positioned between said switch plate and said partition means and being relatively thin in portions clamped between said body sections.

2. A multiport valve for selectively connecting a plurality of valve ports to one another comprising first and second separable body sections, said first body section being generally cylindrical having a circular valve face at one end and having a plurality of separate control ports open to said valve face, each control port being adapted to be connected to a pressure line, said first body section also providing a lateral projection laterally offset to one side of said valve face and provided with an inlet opening substantially coplanar with said valve face and open to an inlet port, said second body section being generally circular and providing a circular open end proportioned to mate with said valve face in said first body section and a lateral offset projection separate from said circular opening providing an inlet opening mating with the inlet opening of said first body section, said second body section providing a valve chamber co-extensive with said valve face connected to its inlet opening, a first circular seal provisioned at said valve face and providing a fluid tight joint between said body sections at said valve face, a second seal providing a fluid tight joint between said body sections at said inlet openings, and a circular switch plate supported in said second body section for rotation about the axis of said valve face, said switch plate being selectively rotatable about said axis between a plurality of valving positions in each of which it engages said first seal and provides selected connections between said control ports and said inlet port, said body sections being separable along a plane substantially adjacent to said first and second seals permitting easy replacement and servicing thereof, said body sections being substantially circular except at said projections with a diameter proportioned to closely enclose said switch plate.

3. A multiport valve according to claim 2 wherein said first body section includes partition means separating said control ports.

4. A multiport valve according to claim 3, wherein each control port is in direct and unvalved fluid communication with said valve face.

5. A multiport valve according to claim 2, wherein the periphery of said first seal is clamped between said body sections to provide a fluid seal for those sections.

6. A multiport valve according to claim 5, wherein said gasket has a relatively incompressible core and a relatively compressible case.

7. A multiport valve for selectively connecting a plurality of valve ports to one another comprising a valve body, said valve body having separable body sections defining first and second chambers, a plurality of inlet and outlet ports in said valve body with all of said ports being located in the body section defining said second chamber, valving means separating said first and second chambers and including means to provide selective communication between the first chamber and at least one port to provide selective communication among the ports and to block communication between the chambers, said body sections being separable adjacent a plane passing through said valving means, and passage means defined by both body sections providing fluid communication from an inlet port to said first chamber, said passage means being laterally offset from said valving means and being isolated from said valving means by wall means, said second chamber including partition means separating said chamber into a plurality of segmented chambers, said valving means including a switch plate having an aperture therethrough to provide fluid communication between said first chamber and one of said segmented chambers having means to provide fluid communication between at least two adjacent segmented chambers and having means to block fluid communication between said first chamber and remaining segmented chambers, said valving means including a gasket between said switch plate and said partition means, the periphery of said gasket being clamped between said body sections to provide a fluid seal for those sections, said gasket having a relatively incompressible core and a relatively compressible case, said case being relatively thick in portions positioned between said switch plate and said partition means and being relatively thin in portions clamped between said body sections.

8. A multiport valve for selectively connecting a plurality of valve ports to one another comprising a valve body, said valve body having separable body sections defining first and second chambers, a plurality of inlet and outlet ports in said valve body, with all of said ports being located in the body section defining said second chamber, valving means separating said first and second chambers and including means to provide selective communication between the first chamber and at least one port, to provide selective communication among the ports, and to block communication between the chambers, said body sections being separable adjacent a plane passing through said valving means, passage means defined by both body sections providing fluid communication from an inlet port to said first chamber, said passage means being laterally offset from said valving means and being isolated from said valving means by wall means, said second chamber including partition means separating said chamber into a plurality of segmented chambers, said valving means including a switch plate having an aperture therethrough to provide fluid communication between said first chamber and one of said segmented chambers, having means to provide fluid communication between at least two adjacent segmented chambers, and having means to block fluid communication between said first chamber and remaining segmented chambers, said valving means including a gasket between said switch plate and said partition means, the periphery of said gasket being clamped between said body sections to provide a fluid seal for those sections, said gasket having a relatively incompressible core and a relatively compressible case, said case being relatively thick in portions positioned between said switch plate and said partition means and being relatively thin in portions clamped between said body sections.

* * * * *